(12) United States Patent
Skinner et al.

(10) Patent No.: US 11,209,350 B2
(45) Date of Patent: Dec. 28, 2021

(54) ADDING ION SENSITIVITY TO AN INTEGRATED COMPUTATIONAL ELEMENT (ICE)

(71) Applicant: Halliburton Energy Services, Inc., Houston, TX (US)

(72) Inventors: Neal G. Skinner, Lewisville, TX (US); Michel Joseph Leblanc, Houston, TX (US); Kenneth G. Dixson, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 642 days.

(21) Appl. No.: 15/777,170

(22) PCT Filed: Jan. 27, 2016

(86) PCT No.: PCT/US2016/015182
§ 371 (c)(1),
(2) Date: May 17, 2018

(87) PCT Pub. No.: WO2017/131673
PCT Pub. Date: Aug. 3, 2017

(65) Prior Publication Data
US 2018/0328843 A1 Nov. 15, 2018

(51) Int. Cl.
*G01N 21/31* (2006.01)
*G01N 21/64* (2006.01)
(Continued)

(52) U.S. Cl.
CPC .......... *G01N 21/31* (2013.01); *G01N 1/4005* (2013.01); *G01N 21/64* (2013.01); *G01N 21/65* (2013.01); *G01N 2001/4016* (2013.01)

(58) Field of Classification Search
CPC ...... G01N 21/31; G01N 1/4005; G01N 21/64; G01N 21/65; G01N 2001/4016
See application file for complete search history.

(56) References Cited

U.S. PATENT DOCUMENTS

| 5,413,685 A | 5/1995 | Ozawa et al. |
| 5,691,205 A | 11/1997 | Kawabata et al. |

(Continued)

FOREIGN PATENT DOCUMENTS

| EP | 2682745 A1 * | 1/2014 | ....... G01N 33/48707 |
| WO | WO-2015047388 A1 | 4/2015 | |
| WO | WO-2017/135932 A1 | 8/2017 | |

OTHER PUBLICATIONS

International Search Report and Written Opinion from PCT/US2016/015182, dated Oct. 18, 2016, 17 pages.

*Primary Examiner* — Dennis White
(74) *Attorney, Agent, or Firm* — McGuireWoods LLP

(57) ABSTRACT

A device including an ion-selective membrane arranged within an optical path of the device and coupled to a sample cell to interact with a fluid sample and thereby modify an optical response of the ion-selective membrane according to an ion con-centration in the fluid sample, is provided. The device also includes an integrated computational element (ICE) arranged within the optical path, so that the illumination light optically interacts with the ICE and with the ion-selective membrane to provide a modified light that has a property indicative of the ion concentration in the fluid sample. A detector that receives the modified light provides an electrical signal proportional to the property of the modified light. A method and a system for using the above device are also provided.

14 Claims, 11 Drawing Sheets

(51) Int. Cl.
*G01N 21/65* (2006.01)
*G01N 1/40* (2006.01)

(56) References Cited

U.S. PATENT DOCUMENTS 9,217,705 B1 * 12/2015 Russell .................. G01N 21/27
2003/0206026 A1   11/2003 Diakonov et al.
2018/0299423 A1   10/2018 Leblanc

* cited by examiner

ADDING ION SENSITIVITY TO AN INTEGRATED COMPUTATIONAL ELEMENT (ICE)

BACKGROUND

In the field of oil and gas exploration and extraction, measurement of ion concentration in fluids is performed via complex sampling techniques involving chemical reagents and time-consuming procedures. However, the high potential for error and inaccuracies, and the low time resolution of traditional ion measurement techniques, can be impractical in many downhole situations where conditions may change rapidly under harsh environments.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, as will occur to those skilled in the art and having the benefit of this disclosure.

In the figures, elements or steps having the same or similar reference numerals have the same or similar description and configuration, unless stated otherwise.

DETAILED DESCRIPTION

Figure 1A:
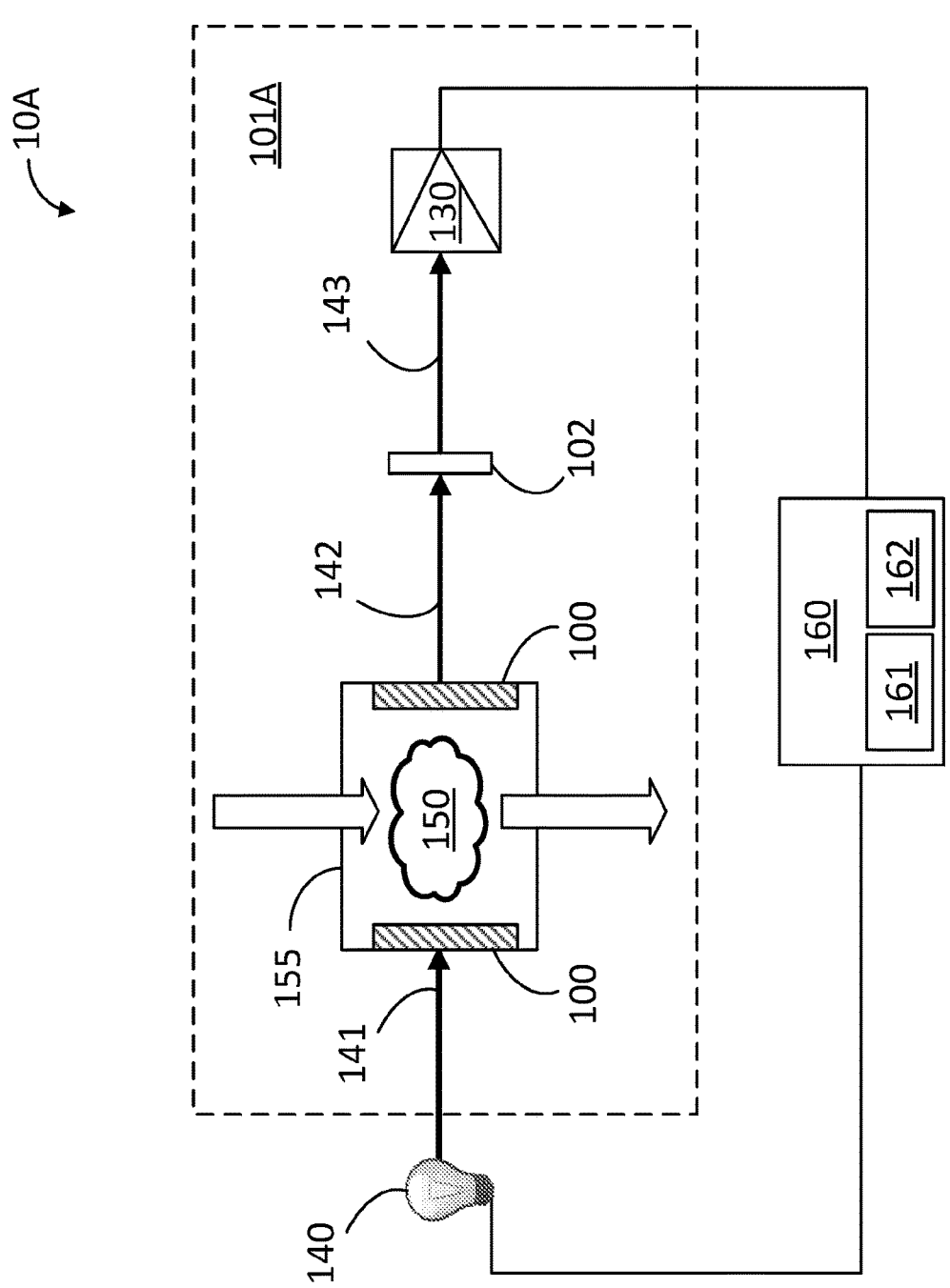
FIG. 1A illustrates a system for measuring an ion concentration of a sample fluid using an optical computing device including an integrated computational element (ICE).

The present disclosure relates to systems, devices, and methods for measuring ion concentrations in sample fluids in the oil and gas exploration and extraction industry. Water is often a by-product of extracted hydrocarbon fluid, and it is desirable to determine where the extracted water comes from within a wellbore. More particularly, water or a water-based solution is often injected into a wellbore as part of the hydrocarbon extraction operation in order to retrieve hydrocarbons or to introduce additives to facilitate drilling and extraction operations. It can be beneficial to establish whether water or a water-based solution produced from a wellbore constitutes water originating from the well or water deliberately injected into the well.

For example, in some embodiments an additive may be injected into the wellbore with the objective of sealing, repairing, or modifying in some way the hydrocarbon production in certain parts of an extraction well, such as a production zone. Such additives may include, for example, cement. In such situations, it is desirable to know whether the cement is settling in the intended location. Moreover, water-based solutions including different ions may improve the mobility of the oil and thereby its extraction efficiency from the wellbore. Accordingly, different ion solutions are often injected into subterranean formations surrounding the wellbore to facilitate oil extraction. In such configurations, it is desirable to measure which ion arrives first to the wellbore to determine which ion solution worked more efficiently in increasing oil mobility in the surrounding formations. Some production operations proceed by injecting a known ion concentration in the additive fluid, which, upon being measured at the wellbore, provides positive indication of the location of the settlement of the additive fluid within the surrounding formations.

Current downhole measurement techniques tend to address physical properties of samples and fluids, such as mechanical properties, electrical properties, or the chemical identity of certain compounds. Current wellbore wireline technology is often used to analyze the chemical makeup of downhole fluids and can determine the presence and quantity of several molecules or groups of chemicals such as $CO_2$, asphaltenes, methane, ethane, propane, water, saturates, aromatics, resins, gas/oil ratios (GOR), and $H_2S$. However, in order to understand the chemical status of a downhole operation such as pH, reactivity, and/or chemical stability, a wet chemical analysis is typically performed at the well surface. Embodiments of the present disclosure provide the capability of undertaking wet chemical analysis downhole within a wellbore in real time.

Embodiments described in the present disclosure extend the sensing advantages of optical computing devices to individual ion species such as, but not limited to, $Na^+$, $Ca^{+2}$ $K^+$, $Mg^{+2}$, $Cr^{+3}$, $HCO_3^-$, $SO^-$, $NH^+$, and $NO_3^-$. Embodiments described herein may facilitate measurement of positive ions or negative ions in such ion species depending on the desired target. Optical computing devices as disclosed herein combine integrated computational element (ICE) technology and ion-selective optode technology to monitor in real time ion concentrations of downhole fluids, products, and various chemical and physical properties associated therewith.

An ICE as disclosed herein is an element or device that optically interacts with a substance to determine quantitative and/or qualitative values of one or more physical or chemical properties of the substance. The ICE may include multilayered interference elements designed to operate over a continuum of wavelengths in the electromagnetic spectrum from the ultraviolet (UV, about 290 nm to about 400 nm) to mid-infrared (MIR, about 2500 nm to about 10,000 nm) ranges, or any sub-set of those regions. Electromagnetic radiation that optically interacts with the ICE is modified to be readable by a detector such that an output of the detector can be correlated to the physical or chemical property or "characteristic" of the substance being analyzed.

As used herein, the term "characteristic" refers to a chemical, mechanical, or physical property of a substance or a sample of a substance. A characteristic of a substance may include a quantitative or qualitative value of one or more chemical constituents or compounds present therein, or any physical property associated therewith. Such chemical constituents and compounds may be alternately referred to herein as "analytes." Illustrative characteristics of a substance that can be monitored with the optical computing devices described herein can include chemical composition (e.g., identity and concentration in total or of individual components), phase presence (e.g., gas, oil, water, etc.), impurity content, ion content, pH, alkalinity, viscosity, density, ionic strength, total dissolved solids, salt content (e.g., salinity), porosity, opacity, bacteria content, total hardness, combinations thereof, state of matter (solid, liquid, gas, emulsion, mixtures, etc.), and the like.

As used herein, the term "electromagnetic radiation" refers to radio waves, microwave radiation, mid-infrared (MIR) and near-infrared radiation (NIR), visible light (VIS), ultraviolet light (UV), X-ray radiation and gamma ray radiation.

As used herein, the term "optical computing device" refers to an optical device that is configured to receive an input of electromagnetic radiation, to interact the electromagnetic radiation with a substance and to produce an output of electromagnetic radiation from a processing element arranged within the optical computing device. In some embodiments, an optical computing device also includes a detector to generate an electronic signal indicative of a characteristic of the substance. The processing element may be, for example, an ICE, which is alternately referred to as a multivariate optical element (MOE). The electromagnetic radiation that optically interacts with the processing element is modified so as to be readable by a detector, such that an output of the detector can be correlated to a particular characteristic of the substance. The output of electromagnetic radiation from the processing element can be reflected, transmitted, and/or dispersed electromagnetic radiation. Whether the detector analyzes reflected, transmitted, or dispersed electromagnetic radiation may be dictated by the structural parameters of the optical computing device as well as other considerations known to those skilled in the art. In addition, emission and/or scattering of the fluid, for example via fluorescence, luminescence, Raman, Mie, and/or Raleigh scattering, can also be monitored by optical computing devices.

As used herein, the term "optically interact" or variations thereof refers to the reflection, transmission, scattering, diffraction, or absorption of electromagnetic radiation either on, through or from one or more processing elements (i.e., ICE or MOE components) or a substance being analyzed by the processing elements. Accordingly, optically interacted light refers to electromagnetic radiation that has been reflected, transmitted, scattered, diffracted, or absorbed, emitted, or re-radiated, for example, using a processing element, but may also apply to interaction with a substance.

In a first embodiment, a device includes an ion-selective membrane arranged within an optical path of the device and coupled to a sample cell to interact with a fluid sample and thereby modify an optical response of the ion-selective membrane according to an ion concentration in the fluid sample, wherein the optical path is defined by an illumination light. The device also includes an integrated computational element (ICE) arranged within the optical path, wherein the illumination light optically interacts with the ICE and with the ion-selective membrane to provide a modified light that has a property indicative of the ion concentration in the fluid sample. A detector receives the modified light and provides an electrical signal proportional to the property of the modified light.

In a second embodiment, a device includes an optical waveguide that transmits an illumination light to a detector. The optical waveguide couples with a sample in at least one sample portion of the waveguide. The device also includes an ion-selective membrane arranged within the sample portion of the waveguide to interact with the sample and thereby modify an optical response of the ion-selective membrane according to an ion concentration in the sample. The device also includes an integrated computational element (ICE) arranged within an optical path defined by the illumination light to provide a modified light that has a property indicative of the ion concentration in the sample. In some embodiments, the detector receives the modified light and provides an electrical signal proportional to the property of the modified light.

In yet another embodiment, a method includes exchanging ions exchange between a material and a sample and optically interacting the material with an illumination light generated by an optical source to generate modified light. The method further includes detecting a change in the optical response of the material based on the modified light and determining an ion concentration in the sample from the change in the optical response of the material. The method may further include modifying an operational parameter in a wellbore for oil and gas exploration or extraction according to the determined ion concentration.

FIG. 1A illustrates a system 10A for measuring an ion concentration of a sample fluid 150 using an optical computing device 101A including an ICE 102. Optical computing device 101A includes an ion-selective membrane 100 arranged within an optical path of optical computing device 101A, and coupled to a sample cell 155. Sample cell 155 allows sample fluid 150 to interact with ion-selective membrane 100 to modify an optical response of ion-selective membrane 100 according to an ion concentration in sample fluid 150. In that regard, ion-selective membrane 100 may be an ion sensitive ion-selective membrane that absorbs a pre-selected type of ion from sample fluid 150 when ion-selective membrane 100 makes contact with the sample fluid 150. Accordingly, the affinity of ion-selective membrane 100 for the pre-selected ion depends on the material forming ion-selective membrane 100; including its structural characteristics, such as porosity, the ion charge, the ion mass, the solvent carrying the ion in the fluid (e.g., water, alcohol), and the presence of other ions in the solution (e.g., the pH of a water solution). The affinity of ion-selective membrane 100 for ions in sample fluid 150 also depends on various environmental factors such as temperature and pressure of sample fluid 150.

The optical path in optical computing device 101A is defined by an illumination light 141 generated by an optical source 140. Sample cell 155 helps facilitate optical interaction of illumination light 141 with ion-selective membrane 100, thus generating sample light 142. More specifically, sample cell 155 provides a location for the optical interaction between illumination light 141 and ion-selective membrane 100 to take place. In some embodiments, optical source 140 may be a broadband lamp, a laser, a light-emitting diode, or any other source of electromagnetic radiation. In some embodiments, sample light 142 may include fluorescence emitted photons or Raman shifted photons from sample fluid 150.

Integrated computational element (ICE) 102 optically interacts with sample light 142 to provide modified light 143. A property of modified light 143 is indicative of a characteristic of sample fluid 150, such as the ion concentration in sample fluid 150. In some embodiments, the property of the modified light that is indicative of the ion concentration in sample fluid 150 may be an intensity, a polarization state, a phase, a wavelength, or any combination of the above. Optical computing device 101A also includes a detector 130 that receives modified light 143 and provides an electrical signal to a controller 160. In some embodiments, the electrical signal is proportional to the property of modified light 143.

In some embodiments, ICE 102 is configured so that the irradiance of modified light 143 is proportional to the absorbed value of the ion in ion-selective membrane 100. Accordingly, the absorbed value of the ion in ion-selective membrane 100 may be determined from the amount of modified light 143 arriving to detector 130. In addition, the ion concentration in sample fluid 150 is associated with the ion adsorption in ion-selective membrane 100 from a known correlation between the two values. More generally, the position of ICE 102 relative to sample cell 155 may be interchangeable. Accordingly, in some embodiments ICE 102 may be disposed between optical source 140 and sample cell 155, generating modified light 143 directly from illumination light 141. In such embodiments, ion-selective membrane 100 interacts with modified light 143 to generate sample light 142, which is then measured by detector 130.

According to embodiments consistent with FIG. 1A, at least one side of sample cell 155 is coupled with ion-selective membrane 100. For example, in some embodiment a window in sample cell 155 may be coated on the inside (the side that comes into contact with sample fluid 150) with a layer of material forming ion-selective membrane 100. The optical absorption spectrum of ion-selective membrane 100 changes in response to the pre-selected ion. As fluid 150 moves through sample cell 155, it interacts with ion-selective membrane 100, changing the absorption spectrum of sample cell 155 in response to the ion concentration in fluid 150. Accordingly, the intensity of light hitting detector 130 is indicative of the pre-selected ion concentration in sample fluid 150. In that regard, sample fluid 150 may be transparent to illumination light 141. For example, in some embodiments illumination light 141 only interacts with ion-selective membrane 100.

In some embodiments, sample cell 155 may include a relatively thin fluid passage (about 1 mm thick), through which at least a portion of sample fluid 150 passes for measurement. This may include a wireline-deployed tool such as a reservoir description tool (RDT™), where a pump is used to force fluid 150 through sample cell 155. A controller 160 has a processor 161 and a memory 162. Memory 162 stores data and commands which, when executed by processor 161, cause controller 160 to direct system 10A to perform steps in methods consistent with the present disclosure.

Figure 1B:
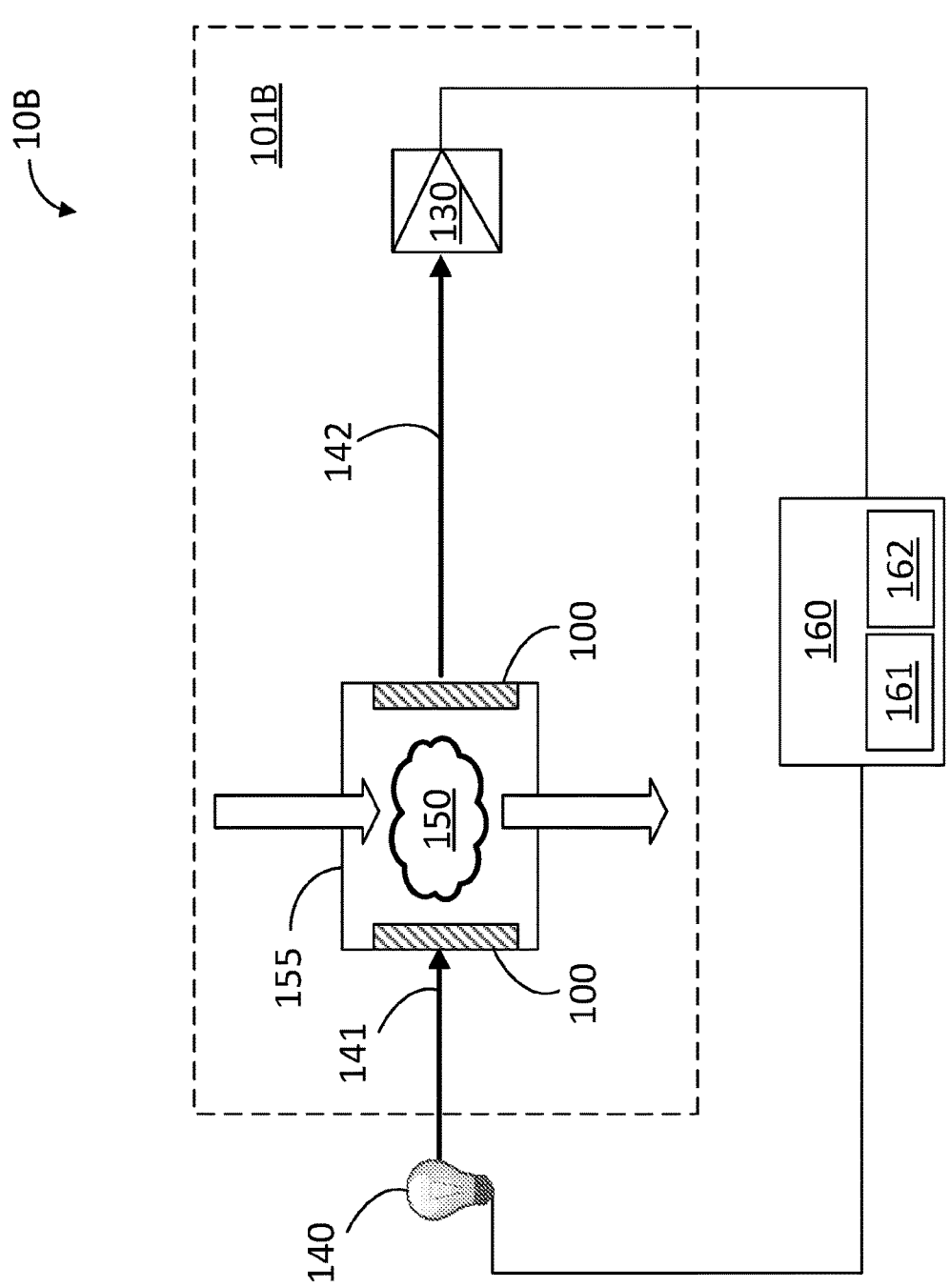
FIG. 1B illustrates a system for measuring an ion concentration of a sample fluid using an optical computing device.

FIG. 1B shows a system 1013 for measuring an ion concentration of a sample fluid 150 using an optical computing device 101B. Elements in FIG. 1B having the same reference numeral as in FIG. 1A have the same detailed description as given above, and their description will not be repeated hereinafter. In optical computing device 101B, detector 130 is configured to measure sample light 142 directly and provide an electric signal to controller 160 for processing. In that regard, sample light 142 may provide direct information of the absorbed value of the ion in ion-selective membrane 100, for example when sample light 142 is a fluorescent emission light, or a Raman shifted light. In such configurations, the intensity of the emitted fluorescent light or the intensity of the Raman light may be proportional to the ion concentration in ion-selective membrane 100. Moreover, a wavelength shift in the fluorescence emission or in the Raman emission may be indicative of the ion adsorption value in ion-selective membrane 100. In some embodiments, an optical filter (not shown) is used in front of detector 130 to select the range of wavelengths of the sample light needed for the measurement (e.g. Raman spectrum) while removing other wavelengths (e.g., original excitation laser wavelength).

Figure 2:
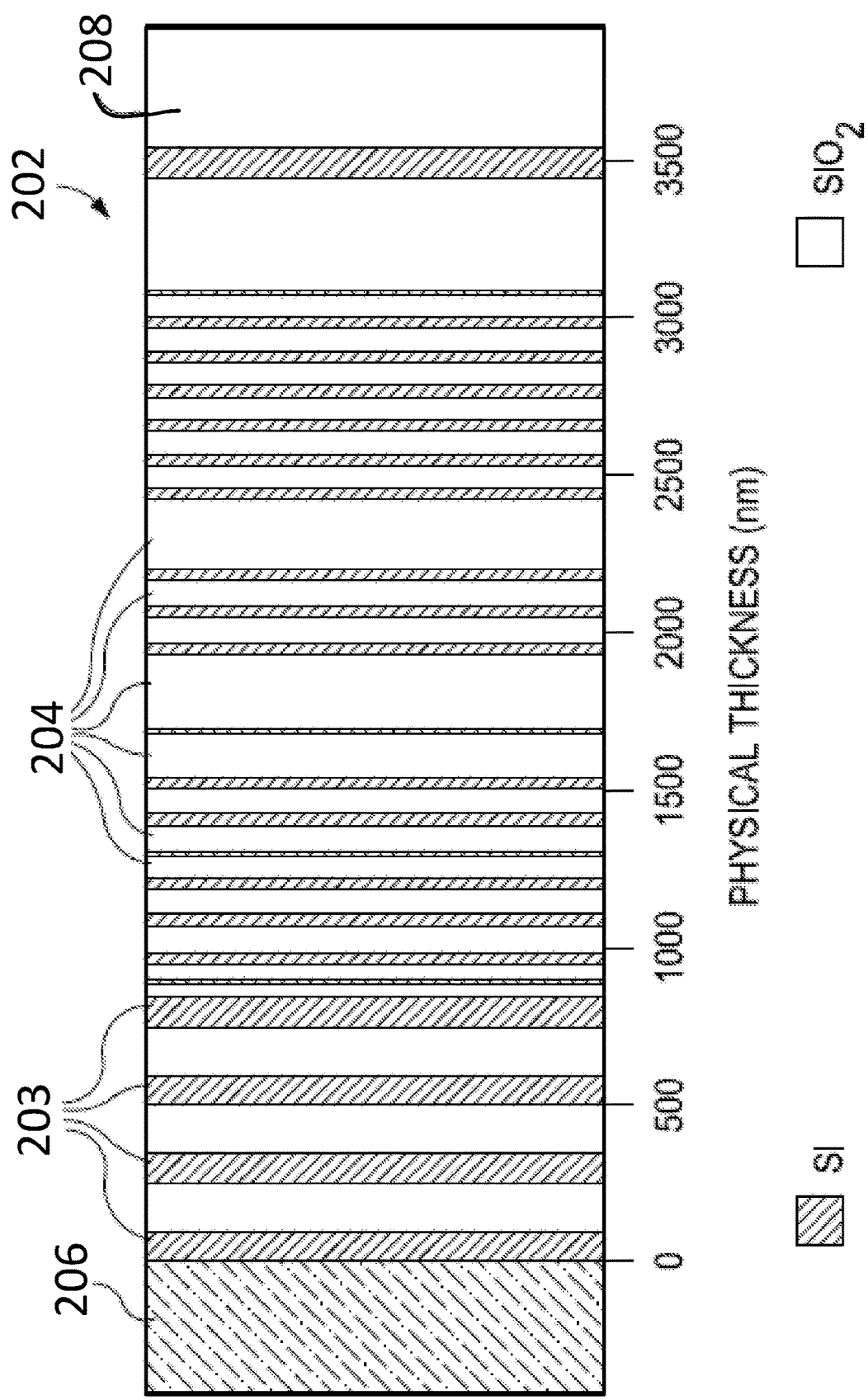
FIG. 2 illustrates a cross-sectional view of an exemplary integrated computational element (ICE) for measuring an ion concentration of a sample fluid.

FIG. 2 illustrates a cross-sectional view of an exemplary integrated computational element (ICE) 202 for measuring an ion concentration in sample fluid 150. ICE 202 may be similar to or the same as ICE 102 of FIG. 1A and, therefore, may be used in optical computing device 101A of FIG. 1A. As illustrated, ICE 202 may include a plurality of alternating layers 203 and 204, such as silicon (Si) and $SiO_2$ (quartz), respectively. In general, layers 203, and 204 include materials whose index of refraction is high and low, respectively. Other examples of materials for use in layers 203 and 204 might include niobia and niobium, germanium and germania, MgF, SiO, and other high and low index materials known in the art. Layers 203, 204 may be strategically deposited on an optical substrate 206. In some embodiments, the optical substrate 206 is BK-7 optical glass. In other embodiments, optical substrate 206 may be another type of optical substrate, such as quartz, sapphire, silicon, germanium, zinc selenide, zinc sulfide, or various plastics such as polycarbonate, polymethylmethacrylate (PMMA), polyvinylchloride (PVC), diamond, ceramics, combinations thereof, and the like.

At the opposite end (e.g., opposite optical substrate 206 in FIG. 2), ICE 202 may include a layer 208 that is generally exposed to the environment of the device or installation, and may be able to detect a sample substance. In some embodiments, layer 208 may include an ion-selective membrane (e.g., ion-selective membranes 100, 100a, 100b cf. FIGS. 1A-1B). In such embodiments, ICE 202 may be disposed in sample cell 155 such that layer 208 makes contact with or is in close proximity to sample fluid 150, thereby allowing the pre-selected ions to be absorbed in layer 208. In some embodiments, ICE 202 may be deposited on an outer surface of a window in sample cell 155 (cf. FIGS. 1A-1B), and ion-selective membrane 100 may be deposited on an inner surface of the same window. In such embodiments, the window in sample cell 155 may act as a rigid substrate from both ICE 202 and ion-selective membrane 100.

The number of layers 203, 204 and the thickness of each layer 203, 204 are determined from the spectral attributes acquired from a spectroscopic analysis of a characteristic of the substance being analyzed using a conventional spectroscopic instrument. The spectrum of interest of a given characteristic typically includes any number of different wavelengths. It should be understood that ICE 202 in FIG. 2 does not in fact represent any particular characteristic of a given substance, but is provided for purposes of illustration only. Consequently, the number of layers 203, 204 and their relative thicknesses, as shown in FIG. 2, bear no correlation to any particular characteristic. Nor are layers 203, 204 and their relative thicknesses necessarily drawn to scale, and therefore should not be considered limiting of the present disclosure. Moreover, those skilled in the art will readily recognize that the materials that make up each layer 203, 204 (i.e., Si and $SiO_2$) may vary, depending on the application, cost of materials, and/or applicability of the material to the given substance being analyzed.

In some embodiments, the material of each layer 203, 204 can be doped or two or more materials can be combined in a manner to achieve the desired optical characteristic. In addition to solids, ICE 202 may also contain liquids and/or gases, optionally in combination with solids, in order to produce a desired optical characteristic. In the case of gases and liquids, ICE 202 can contain a corresponding vessel (not shown), which houses the gases or liquids. Exemplary variations of ICE 202 may also include holographic optical elements, gratings, frequency selective surfaces, piezoelectric, light pipe, and/or acousto-optic elements, for example, that can create transmission, reflection, and/or absorptive properties of interest.

Layers 203 and 204 exhibit different refractive indices. By properly selecting the materials of layers 203, 204 and their relative thickness and spacing, ICE 202 may be configured to selectively pass/reflect/refract predetermined fractions of electromagnetic radiation at different wavelengths. Each wavelength is given a predetermined weighting or loading factor. The thickness and spacing of layers 203, 204 may be determined using a variety of approximation methods from the spectrum of the characteristic or analyte of interest. These methods may include inverse Fourier transform (IFT) of the optical transmission spectrum and structuring ICE 100 as the physical representation of the IFT. The approximations convert the IFT into a structure based on known materials with constant refractive indices.

The weightings that layers 203, 204 of ICE 202 apply at each wavelength are set to the regression weightings described with respect to a known equation, or data, or spectral signature. When electromagnetic radiation interacts with a substance, unique physical and chemical information about the substance may be encoded in the electromagnetic radiation that is reflected from, transmitted through, or radiated from the substance. This information is often referred to as the spectral "fingerprint" of the substance. ICE 202 performs the dot product of the electromagnetic radiation received by ICE 202 (e.g., sample light 142, cf. FIG. 1A) and the wavelength dependent transmission function of ICE 202. The wavelength dependent transmission function of ICE 202 is dependent on the layer material refractive index, the number of layers 203, 204 and the layer thicknesses. The transmission function of ICE 202 is designed to mimic a desired regression vector derived from the solution to a linear multivariate problem targeting a specific component of the sample being analyzed. As a result, the output light intensity of ICE 202 (e.g., the intensity of modified light 143, cf. FIG. 1A) is proportional a dot product of a transmission spectrum of the sample with the regression vector associated with the characteristic of interest. Accordingly, the output light intensity of ICE 202 is a direct indicator of a value of the characteristic of interest of the sample.

Referring again to FIG. 1A, optical computing device 101A employing ICE 102 may be capable of extracting the information of the spectral fingerprint of multiple characteristics or analytes within a substance (e.g., ions dissolved in sample fluid 150) and converting that information into a detectable output regarding the overall properties of the substance. That is, through suitable configurations of the optical computing device 101A, electromagnetic radiation associated with characteristics or analytes of interest in a substance (e.g., ions dissolved in the sample fluid 150) can be separated from electromagnetic radiation associated with all other components of the substance in order to estimate the properties of the substance in real-time or near real-time. Accordingly, ICE 102 is able to distinguish and process electromagnetic radiation related to a characteristic or analyte of interest.

In that regard, optical source 140 may be configured such that sample fluid 150 is transparent to illumination light 141. Accordingly, sample light 142 differs from illumination light 141 only by the optical interaction with ion-selective membrane 100.

Figure 3:
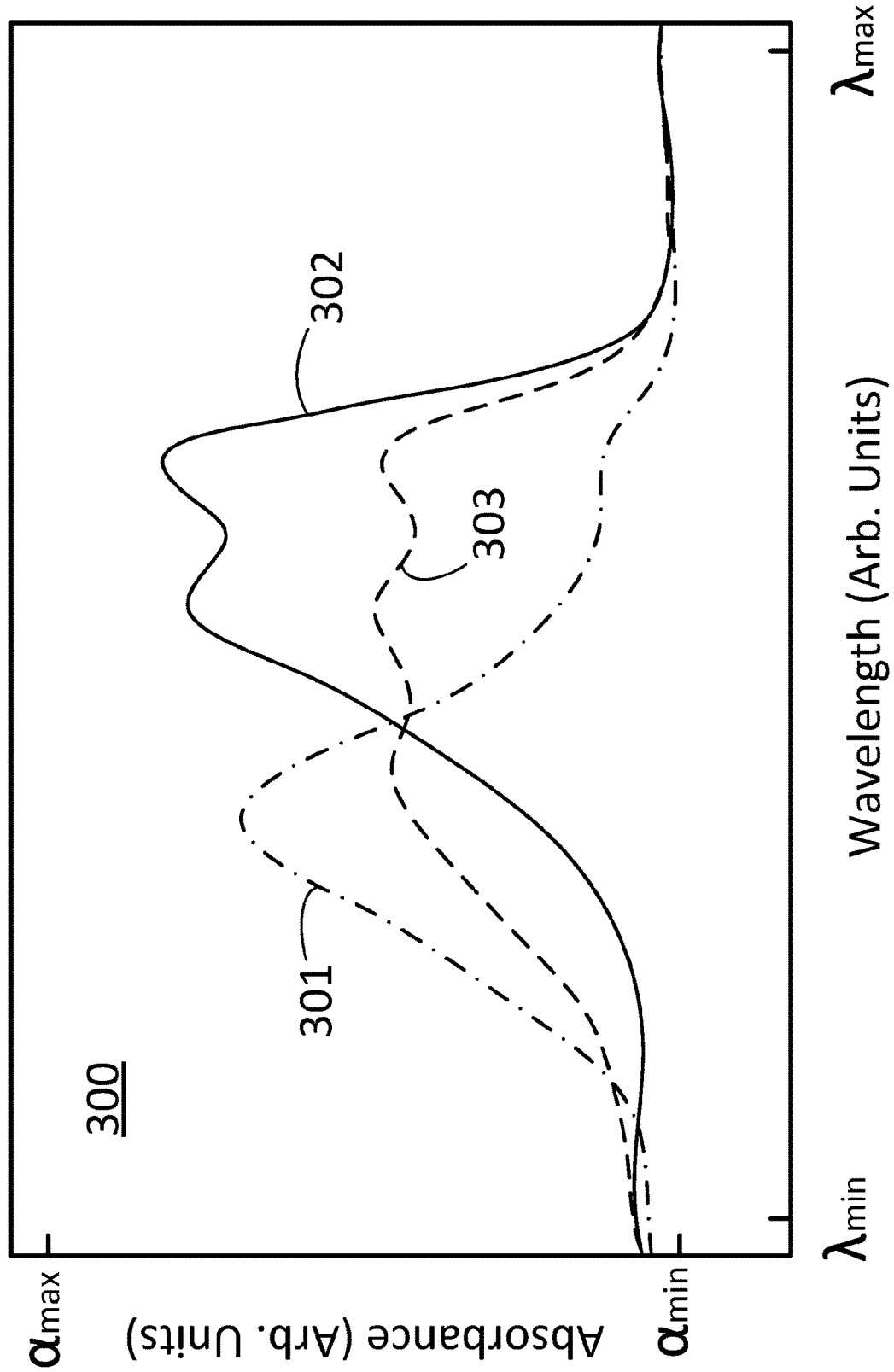
FIG. 3 illustrates spectra of a sample light interacted with an ion-selective membrane when the sample fluid includes three different ion concentrations.

FIG. 3 illustrates a chart 300 with absorbance spectra 301, 302, and 303 of sample light 142 interacted with ion-selective membrane 100 when the sample (e.g., the sample fluid 150 of FIG. 1A) includes three different ion concentrations. The abscissae in chart 300 correspond to wavelength (in arbitrary units), and the ordinates in chart 300 correspond to absorbance (in arbitrary units). Without limitation, the ordinate axis in chart 300 may indicate a fluorescence or a Raman emission amplitude, and the abscissae may indicate a Raman shift instead of a wavelength.

Spectra 301, 302 and 303 each cover a wavelength range from a minimum wavelength $\lambda_{min}$ to a maximum wavelength $\lambda_{max}$. In some embodiments, the wavelength span between $\lambda_{min}$ and $\lambda_{max}$ include the visible wavelength range (from about 400 nm to about 750 nm). More generally, either one of $\lambda_{min}$ or $\lambda_{max}$ may be outside the visible wavelength range, such as the ultra-violet UV wavelength range (from about 290 nm to about 400 nm) and the near-infrared wavelength range (from about 750 nm to about 2500 nm).

Spectrum 301 represents zero or very low concentrations of the pre-selected ion, while a high concentration of the pre-selected ion results in spectrum 302. Spectrum 303 corresponds to an intermediate ion concentration between the high (302) and low (301) ion concentrations in fluid 150. The ions being detected in this case are positively-charged and their presence in the fluid results in an exchange with a hydrogen ion (also positively charged) bonded to a chromo-ionophore (dye) molecule in ion-selective membrane 100. Spectra 301 and 302 are markedly different from one another, and therefore suitable for the spectral regression analysis with ICE 102 to determine the absorbed value of the ion in ion-selective membrane 100.

An advantage of system 10A is the capability of ion-selective membrane 100 to operate at high temperatures such as 100° C., 150° C., 200° C., 250° C. or even higher. The high temperature resilience of ion-selective membrane 100 is a desirable property for downhole measurement tools. The speed at which ion-selective membrane 100 reaches equilibrium with ions dissolved in fluid 150, and the amount of ions absorbed into ion-selective membrane 100 upon equilibrium is determined by the equilibrium constant $K_a$ of ion-selective membrane 100. The $K_a$ constant is a factor that generally depends on the temperature, pressure and pH of sample fluid 150, and also on other conditions such as the material forming ion-selective membrane 100, its porosity, mass, and charge of the pre-selected ion, among other factors. In that regard, some embodiments of ion-selective membranes 100, 100a, and 100b may include a diffusion barrier to delay the absorption of the pre-selected ions from sample fluid 150. In such embodiments, the optical measurement described in system 10A or in system 40A may be performed before the ion concentration between sample fluid 150 and ion-sensitive membrane 100 has reached equilibrium. Accordingly, controller 160 may be configured to measure the speed, or rate of ion absorption into ion-sensitive membrane 100 from sample fluid 150. In turn the speed or rate of absorption may be used to determine a characteristic of sample fluid 150, such as a water concentration (i.e. "water cut" measurement).

Figure 4:
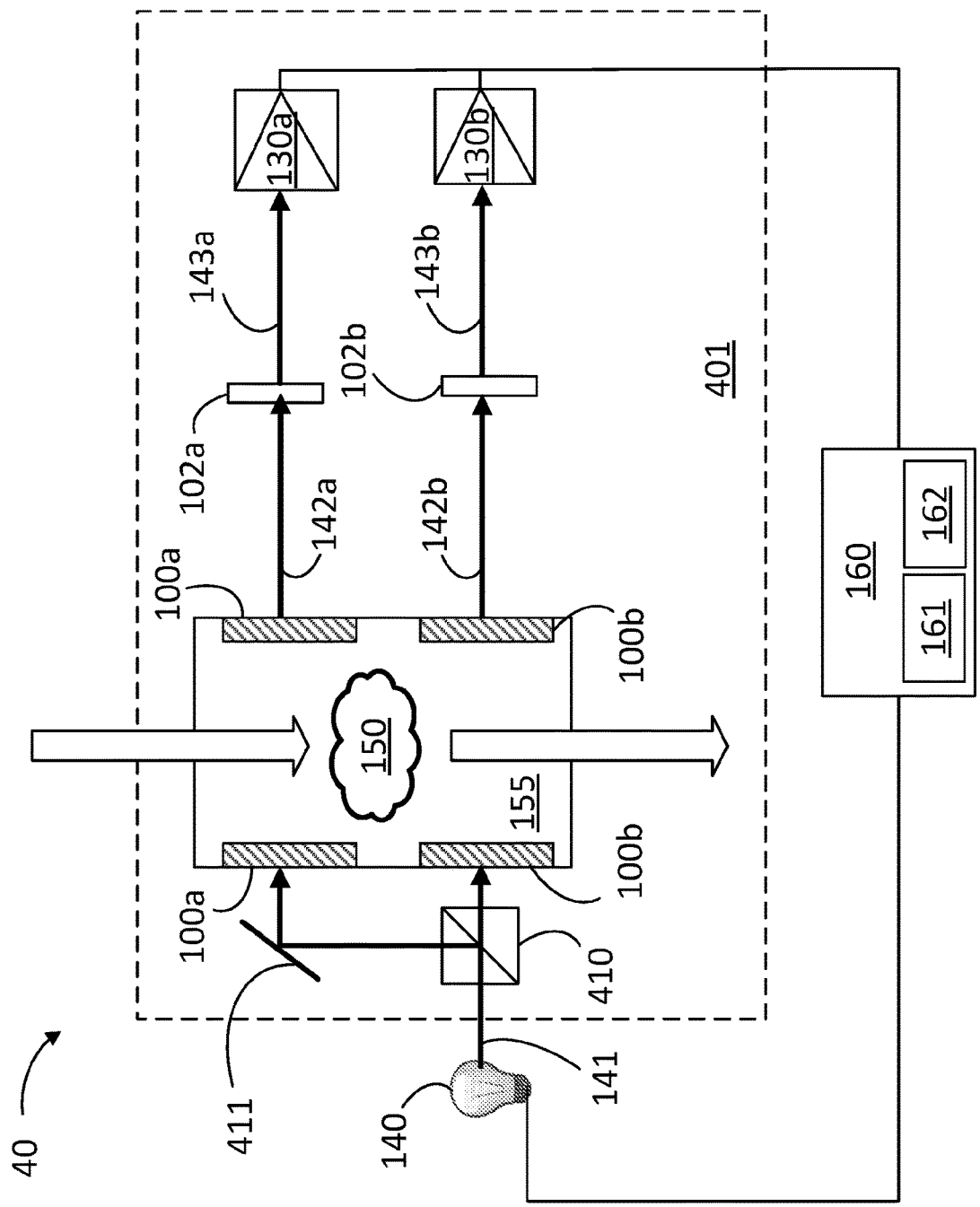
FIG. 4 illustrates a system for measuring a plurality of ion concentrations of a sample fluid using an optical computing device.

FIG. 4 illustrates a system 40 for measuring a plurality of ion concentrations of sample fluid 150 using an optical computing device 401. Elements in system 40 having the same reference numeral as elements in system 10A have the same configuration and description as provided above.

System 40 includes two ion-sensitive ion-selective membranes 100a and 100b, each with an affinity optimized for a different ion. For example, ion-selective membrane 100a may be optimized for $Ca^{+2}$ (calcium) whereas ion-selective membrane 100b may be optimized for $K^+$ (potassium). Beamsplitter 410 separates illumination light 141 into a first portion reflected by mirror 411 and passing through ion-selective membrane 100a, and a second portion passing through ion-selective membrane 100b. In that regard, sample light 142a may include a response from ion-selective membrane 100a and sample light 142b may include a response from ion-selective membrane 100b. Each ICE 102a and 102b optically interacts with sample light 142a and 142b, providing modified light 143a and 143b to detectors 130a and 130b, respectively. Modified light 143a includes a property indicative of a $Ca^{+2}$ concentration and modified light 143b includes a property indicative of a $K^+$ concentration in fluid 150. In some embodiments, ICEs 102a and 102b may be replaced by standard bandpass filters, or may be taken out from optical computing device 401 altogether.

In some embodiments, for example, ion-selective membrane 100a may have a neutral response to sample fluid 150 and ICE 102a may be replaced by a neutral density filter. Accordingly, modified light 143a may be a reference light, and detector 130a may provide a reference measurement to controller 160.

The above-described embodiments may be applied to any two ion concentrations other than $Ca^{+2}$ and $K^+$. Further, the number of different ions measured is not limiting of the embodiments disclosed herein and two, three, or more different ions may be pre-selected for measurement.

Figure 5A:
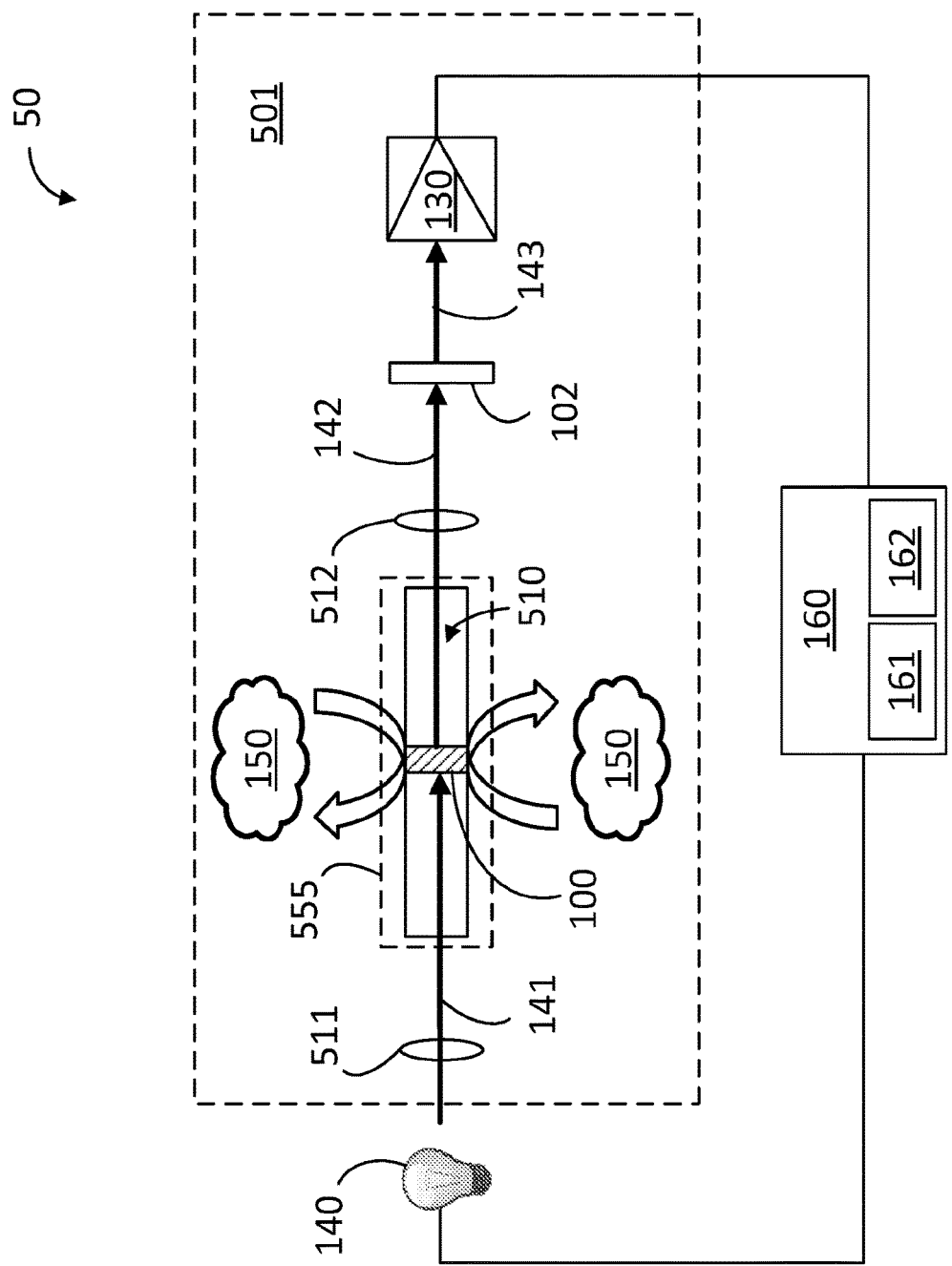
FIG. 5A illustrates a system for measuring an ion concentration of a sample fluid using an optical computing device that includes an optical waveguide.

FIG. 5A illustrates a system 50 for measuring an ion concentration of sample fluid 150 using an optical computing device 501 including an optical waveguide 510. Ion-selective membrane 100 forms a layer interposed in the propagation path of optical waveguide 510, forming a sample cell 555. In some embodiments, sample cell 555 may be dipped into sample fluid 150, rapidly generating an ion-exchange with ion-selective membrane 100, in at least a sample portion of the waveguide. Accordingly, ion-selective membrane 100 may be arranged within the sample portion of the waveguide to facilitate the ion exchange. Accordingly, in a tool with a large flow area such as in a permanent completion wellbore, sample cell 555 is easily exposed to sample fluid 150, rather than coaxing a properly mixed, representative sample to flow through a tiny sample cell 155. Waveguide 510 may be an optical fiber having a diameter of a few tens of microns (1 μm=$10^{-6}$ m), a glass rod having a thicker diameter than a fiber, a light pipe of a few mm in diameter, or any type of optical waveguide configured to propagate illumination light 141 with a low loss.

In some embodiments of system 50, waveguide 510 includes a length of small diameter fiber or other optical waveguide wherein a short, longitudinal section of ion-selective membrane 100 is sandwiched between (interposes) two axially adjacent portions of the waveguide 510. Focusing optics 511 convey illumination light 141 into waveguide 510 and expanding optics 512 receive and expand the resulting sample light 142, and provide sample light 142 to ICE 102 before reaching detector 130. In some embodiments, optical source 140 and optical computing device 501 are contained within a pressure vessel. Thus, the flexibility of waveguide 510 enables adapting optical computing device 501 to any arbitrary shape with waveguide 510 routed outside of the pressure vessel and exposed to a large diameter flow area inside the wellbore. Wellbore fluids (e.g., sample fluid 150) can wash over waveguide 510 and thereby interact with ion-selective membrane 100. Ions in fluid sample 150 change the optical absorption spectrum of ion-selective membrane 100 and allow ICE 102 and detector 130 to determine the concentration of the target ion (cf. spectra 301, 302, and 303, cf. FIG. 3).

Figure 5B:
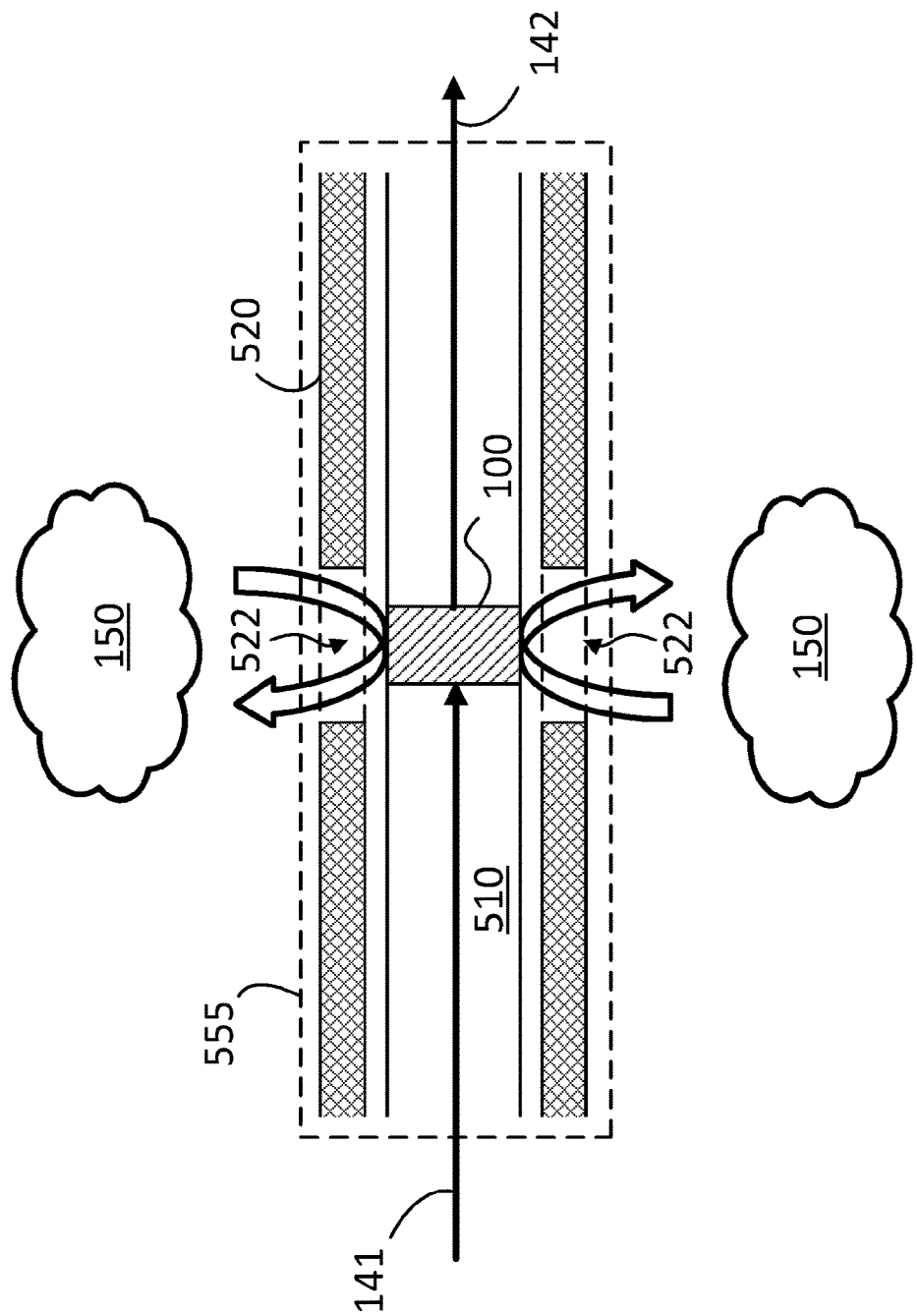
FIG. 5B illustrates an optical waveguide including an ion-selective membrane for use in an optical computing device for measuring an ion concentration of a sample fluid.

FIG. 5B illustrates optical waveguide 510 including ion-selective membrane 100 for use in optical computing device 501 (FIG. 5A) for measuring an ion concentration of sample fluid 150. FIG. 5B shows a more detailed schematic of sample cell 555, which, in some embodiments, includes a protective sleeve 520 covering waveguide 510 and providing one or more slots 522 to allow sample fluid 150 to interact with ion-selective membrane 100. Since the diameter of waveguide 510 is small, ion-selective membrane 100 absorbs ions from sample fluid 150, altering its optical absorbance/transmittance spectrum. Some embodiments include additional support on either end of waveguide 510 to keep optical computing device 501 together, even without adhesively bonding ion-selective membrane 100 to the two waveguide portions shown in the figure. For example, ion-selective membrane 100 may be painted, coated, or deposited on one side of waveguide 510, while the other side of waveguide 510 is abutted on the free side of ion-selective membrane 100.

The material forming ion-selective membrane 100 may have in general a different index of refraction ($n_e$) than that of waveguide 510. This may produce fringing effects in sample light 142, as in a Fabry-Perot interferometer. In some embodiments, illumination light 141 is a broadband light with a coherence length desirably shorter than the thickness of ion-selective membrane 100. Some embodiments may tolerate a limited degree of interference fringes resulting from the finite thickness of ion-selective membrane 100. To mitigate interference and loss effects, in some embodiments it is desirable that the thickness of ion-selective membrane 100 in waveguide 510 be larger than the coherence length of illumination light 141, or the propagating wavelength of illumination light 141. In other embodiments, the surfaces of ion-selective membrane 100 are not parallel in order to avoid Fabry-Pérot effects.

Figure 6:
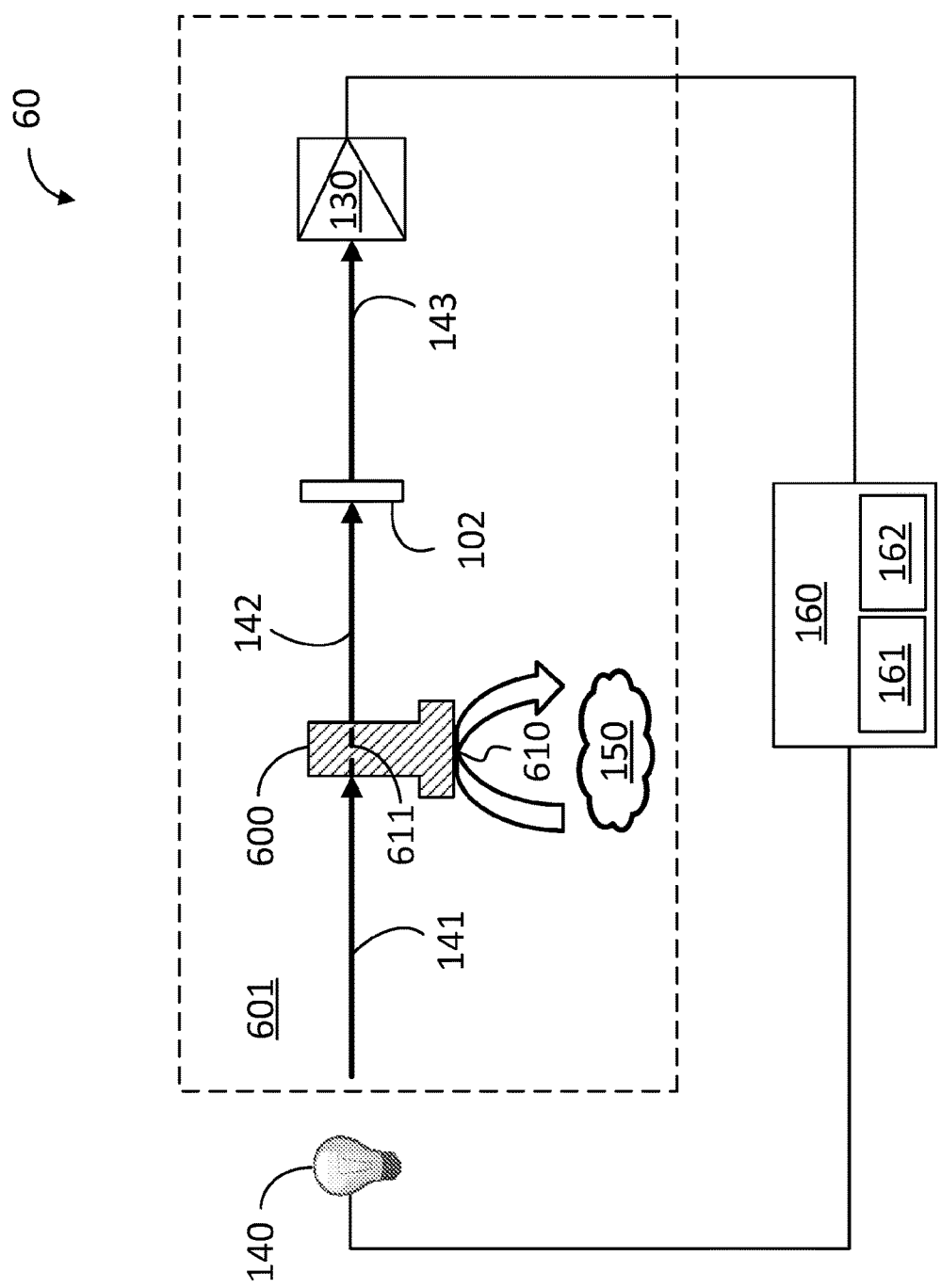
FIG. 6 illustrates a system for measuring an ion concentration of a sample fluid using an ion-selective membrane that interacts with a sample in a first point and interacts with an illumination light in a second point.

FIG. 6 illustrates a system 60 for measuring an ion concentration of sample fluid 150 using optical computing device 601. Optical computing device 601 includes an ion-selective membrane 600 that interacts with sample fluid 150 in a first region 610 and interacts with illumination light 141 in a second region 611. In system 60, ion-selective membrane 600 is disposed along the optical path (train) of illumination light 141. ICE 102 interacts with sample light 142 adjacent region 611 to produce modified light 143, which is subsequently detected by detector 130. Ion-selective membrane 600 extends beyond the optical path of illumination light 141 into region 610, where it is able to physically interact with fluid 150. Ion-selective membrane 600 absorbs ions from fluid 150, which diffuse from region 610 into region 611. Sample light 142 is generated when illumination light 141 interacts with ion-selective membrane 600 in region 611.

Detector 130 may be configured to perform measurements after equilibrium in between ions absorbed in ion-selective membrane 100 and the ion concentration in sample fluid 150 has been reached. Alternatively, detector 130 may perform measurements during an ion diffusion transient between ion-selective membrane 100 and fluid 150. For example, in some embodiments detector 130 may describe in detail the transient speed, which may be indicative of a characteristic of fluid 150. For example, in some embodiments the transient speed may be associated with the presence of water or oil in fluid 150. In that regard, a higher transient speed fluid 150 may be associated with a fluid 150 having more water, or less oil, than a slower transient speed fluid 150.

Figure 7:
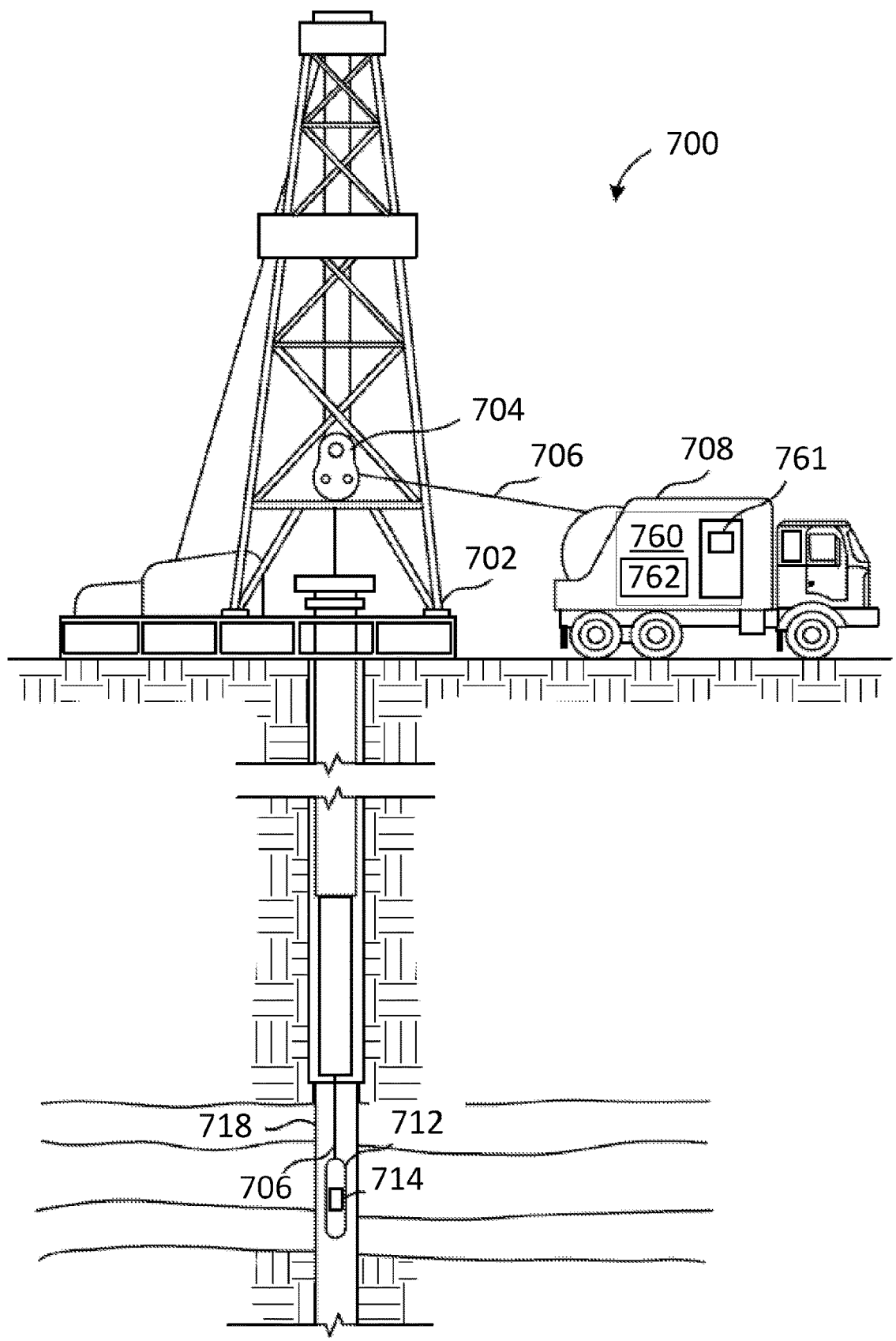
FIG. 7 illustrates a wireline system configured to measure an ion concentration of a sample fluid during formation testing and sampling with an optical computing device.

FIG. 7 illustrates a wireline system 700 configured to measure an ion concentration of a sample fluid during formation testing and sampling with an optical computing device. After drilling of wellbore 718 is complete, it may be desirable to know more details of types of formation fluids and the associated characteristics through sampling with use of a wireline formation tester. System 700 may include a wireline logging tool 712 that forms part of a wireline logging operation that can include one or more optical computing devices 714 as described herein (e.g., optical computing device 101, 401, 501 or 601 cf. FIGS. 1, 4, 5 and 5). Accordingly, any one of optical computing devices 714 may include an ICE according to embodiments disclosed herein (e.g., ICE 202, cf. FIG. 2), and an ion-selective membrane (e.g., ion-selective membranes 100 and 600, cf. FIGS. 1, 4 and 5). System 700 may include a derrick 702 that supports a traveling block 704. Wireline logging tool 712, such as a probe or sonde, may be lowered by wireline or logging cable 706 into borehole 718. Tool 712 may be lowered to the bottom of the region of interest and subsequently pulled upward at a substantially constant speed by wireline or logging cable 606.

Any measurement data generated by wireline logging tool 712 and its associated optical computing devices 714 can be communicated to a surface logging facility 708 for storage, processing, and/or analysis. Logging facility 708 may be provided with controller 760, including processor 761 and memory 762 configured to perform various types of signal processing. Controller 760 may determine a reservoir quality based on a measurement of the ion concentration of an extracted sample fluid from wellbore 718. The reservoir quality may be associated with the ability to extract a high value hydrocarbon from a formation surrounding the wellbore. Many factors may determine a reservoir quality, including pore geometry in the formation surrounding the wellbore and other physical properties of the fluid such as viscosity, density, pH, and ion concentration, among others. Controller 760 may determine at least some of the above physical properties using measurements obtained with optical computing devices 714 as disclosed herein.

Figure 8:
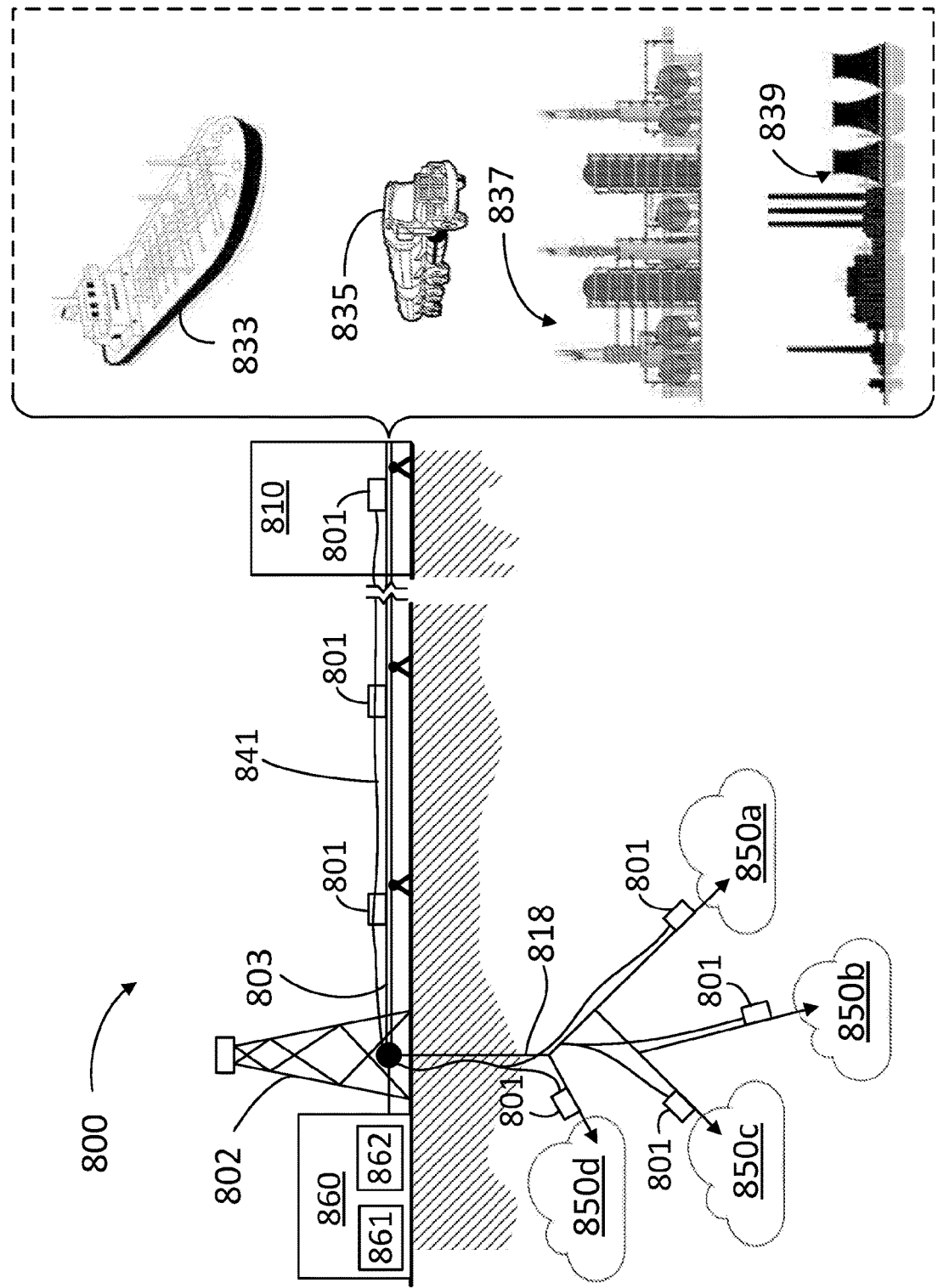
FIG. 8 illustrates a field deployment of a fluid analysis system including multiple optical computing devices for measuring an ion concentration of a sample fluid coupled through an optical fiber link.

FIG. 8 illustrates a field deployment of a fluid analysis system 800 including multiple optical computing devices 801 deployed in wellbore 818 for measuring an ion concentration of a sample fluid. Wellbore 818 may include a plurality of extraction reservoirs including hydrocarbon production zones 850a, 850b, 850c, and 850d, as illustrative examples (collectively referred to hereinafter as production zones 850). For example, in some embodiments the ion concentration in fluids extracted from each of production zones 850 may be different, and indicative of each specific location. In that regard, some embodiments of fluid analysis system 800 include specifically injecting a fluid having a recognizable ion concentration into a distant well (not shown) which is detected in wellbore 818. Fluids containing different ions may be injected from different wells around the wellbore of interest, 818. Accordingly, measuring the ion concentration of an extracted fluid may indicate the origin of the fluid (i.e., whether or not is the same fluid as was originally injected into the wellbore). Moreover, the ion concentration in the extracted fluid may indicate whether the fluid was extracted from either one of production zones 850a, 850b, 850c, or 850d. In some embodiments, fluid analysis system 800 is deployed for long periods of time such as months, years, or even longer periods of time as allowed by the resiliency of optical computing devices 801 over harsh environmental conditions.

At least one of optical computing devices 801 includes an ion-selective membrane as disclosed herein (cf. ion-selective membranes 100 and 600, cf. FIGS. 1 and 6). In fluid analysis system 800, a derrick 802 provides support for hydrocarbon extraction and measurement equipment deployed through wellbore 818. At the surface, fluid analysis system 800 may include a controller 860 having a processor 861 and a memory 862. Controller 860, processor 861, and memory 862 may be as described in detail above (e.g., controllers 160 and 760, processors 161 and 761, and memories 162 and 762 respectively, cf. FIGS. 1 and 7). In some embodiments, controller 860 is configured to determine the origin of an extracted fluid from the ion concentration measured with each of optical computing devices 801. Accordingly, controller 860 may be configured to determine whether an extracted fluid comes from production zone 850a, 850b, 850c, or 850d, or if it was injected at the surface.

Wellbore 818 may be a subterranean wellbore or an undersea operation, in which case derrick 802, controller 860, and a portion of a pipeline 803 may be floating over the sea. The extracted hydrocarbon is transported through pipeline 803 to a delivery port 810, from which the hydrocarbon is transferred to a transportation vehicle (e.g., vessel 833 or truck 835), a refinery 837, or a power plant 839, among others.

Figure 9:
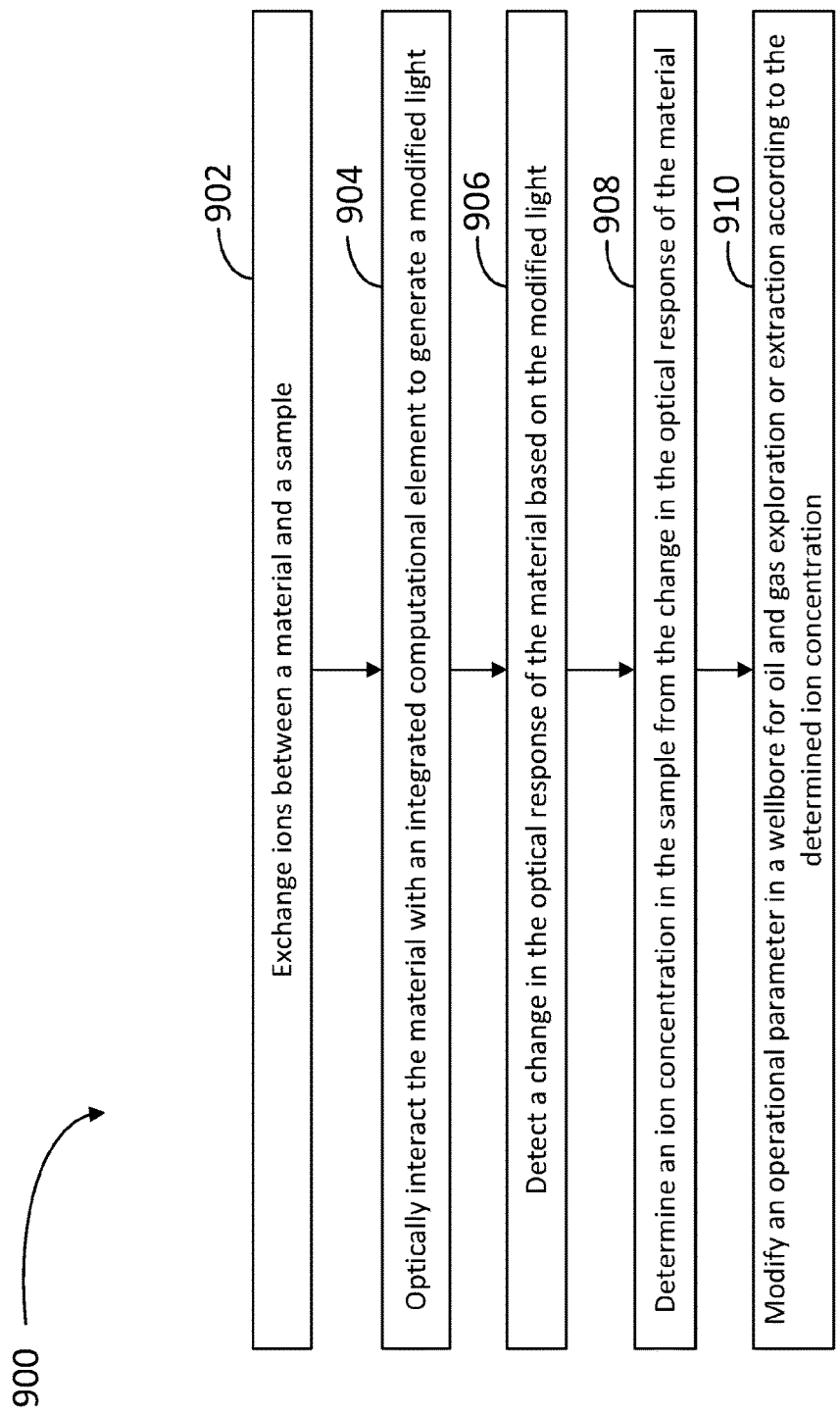
FIG. 9 illustrates a flow chart including steps in a method for measuring an ion concentration of a sample fluid.

FIG. 9 illustrates a flow chart including steps in a method 900 for measuring an ion concentration in a sample fluid. In some embodiments, steps in method 900 may be performed at least partially by a controller including a processor and a memory (e.g., controllers 160, 760, or 860, processors 161, 761, or 861, and memories 162, 762, and 862, cf. FIGS. 1A-B, 4, 7, and 8). The memory may store commands that, when executed by the processor, cause the controller to perform at least some of the steps in method 900. Accordingly, methods consistent with method 900 may be performed in connection with a system including an optical computing device having an ICE and an ion-selective membrane (e.g., systems 10, 40, 50 and 60, ICE 102 and ion-selective membranes 100 and 600, cf. FIGS. 1A-B, 4, 5A, and 6). Moreover, methods consistent with method 900 may include using a optical source to provide an illumination light for the optical computing device, an optical waveguide such as an optical fiber, and a detector (e.g., optical source 140, illumination light 141, optical waveguide 510 and detector 130, cf. FIGS. 1 and 5).

Methods consistent with method 900 may include fewer steps than illustrated in FIG. 9, or other steps in addition to at least one of the steps in method 900. Moreover, methods consistent with the present disclosure may include at least one or more of the steps in method 900 performed in a different sequence. For example, some embodiments consistent with the present disclosure may include at least two steps in method 900 performed overlapping in time, or substantially simultaneously in time.

Step 902 includes exchanging ions between a material and a sample. In some embodiments, step 902 may include exchanging ions between the material and the sample to reach equilibrium. In other embodiments, step 902 is taken before the sample has reached equilibrium with its surroundings so that a transient response is obtained (e.g., in water cut measurements). In some embodiments, step 902 includes exchanging ions between a second material and the sample, wherein the second material has an affinity optimized for a second ion. Step 904 includes optically interacting the material with an ICE to generate a modified light. Step 906 includes detecting a change in the optical response of the material based on the modified light. In some embodiments, step 806 includes measuring a property of the modified light. For example, in some embodiments step 906 includes measuring at least one of an intensity, a polarization, a phase, a wavelength or any combination of the above properties of the modified light.

Step 908 includes determining an ion concentration in the sample from the change in the optical response of the material. Step 908 may include determining first an absorbed value of the ion in the material from the change in the optical response of the material. Further, step 908 may include determining the ion concentration in the sample from the absorbed value assuming ion-transmission equilibrium between the material and the sample. In some embodiments, step 908 includes identifying a temperature, a pressure, and a pH of the sample as factors in determining the ion concentration in the sample. In some embodiments, step 908 may include determining the origin of an extracted fluid from the ion concentration in the sample. Accordingly, the origin of the extracted fluid may be any one of a plurality of production zones in a wellbore (e.g., production zones 850, cf. FIG. 8), or a fluid injected into the wellbore from the surface. Step 910 includes modifying an operational parameter in a wellbore for oil and gas exploration or extraction according to the determined ion concentration. In some embodiments, step 910 may include adding into or removing from an injection fluid certain chemical compounds, in order to modify the pH of the injection fluid, or its reactivity with an membrane in the wellbore. For example, the injection fluid may be a drilling mud and its ion content may indicate the chemical stability of a wellbore ion-selective membrane while drilling.

Those skilled in the art will readily appreciate that the methods described herein, or large portions thereof may be automated at some point such that a computerized system may be programmed to transmit data from an optical computing device using an ICE element. Computer hardware used to implement the various methods and algorithms described herein can include a processor configured to execute one or more sequences of instructions, programming stances, or code stored on a non-transitory, computer-readable medium. The processor can be, for example, a general purpose microprocessor, a microcontroller, a digital signal processor, an application specific integrated circuit, a field programmable gate array, a programmable logic device, a controller, a state machine, a gated logic, discrete hardware components, an artificial neural network, or any like suitable entity that can perform calculations or other manipulations of data. In some embodiments, computer hardware can further include elements such as, for example, a memory (e.g., random access memory (RAM), flash memory, read only memory (ROM), programmable read only memory (PROM), electrically erasable programmable read only memory (EEPROM)), registers, hard disks, removable disks, CD-ROMS, DVDs, or any other like suitable storage device or medium.

Executable sequences described herein can be implemented with one or more sequences of code contained in a memory. In some embodiments, such code can be read into the memory from another machine-readable medium. Execution of the sequences of instructions contained in the memory can cause a processor to perform the process steps described herein. One or more processors in a multi-processing arrangement can also be employed to execute instruction sequences in the memory. In addition, hard-wired circuitry can be used in place of or in combination with software instructions to implement various embodiments described herein. Thus, the present embodiments are not limited to any specific combination of hardware and/or software.

As used herein, a machine-readable medium will refer to any medium that directly or indirectly provides instructions to a processor for execution. A machine-readable medium can take on many forms including, for example, non-volatile media, volatile media, and transmission media. Non-volatile media can include, for example, optical and magnetic disks. Volatile media can include, for example, dynamic memory. Transmission media can include, for example, coaxial cables, wire, fiber optics, and wires that form a bus. Common forms of machine-readable media can include, for example, floppy disks, flexible disks, hard disks, magnetic tapes, other like magnetic media, CD-ROMs, DVDs, other like optical media, punch cards, paper tapes and like physical media with patterned holes, RAM, ROM, PROM, EPROM and flash EPROM.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The disclosure illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of I, II, and III" or "at least one of I, II, or III" each refer to only I, only II, or only III; any combination of I, II, and III; and/or at least one of each of I, II, and III.

Embodiments disclosed herein include:

A. A device including an ion-selective membrane arranged within an optical path of the device and coupled to a sample cell to interact with a fluid sample and thereby modify an optical response of the ion-selective membrane according to an ion concentration in the fluid sample. The optical path of the device is defined by an illumination light. The device includes an integrated computational element (ICE) arranged within the optical path, wherein the illumination light optically interacts with the ICE and with the ion-selective membrane to provide a modified light that has a property indicative of the ion concentration in the fluid sample. In some embodiments, the device includes a detector that receives the modified light and provides an electrical signal proportional to the property of the modified light.

B. A device including an optical waveguide that transmits an illumination light to a detector, and that couples with a fluid sample in at least one sample portion of the waveguide. The device includes an ion-selective membrane arranged within the sample portion of the waveguide to interact with the fluid sample and thereby modify an optical response of the ion-selective membrane according to an ion concentration in the fluid sample. In some embodiments, the device includes an integrated computational element (ICE) arranged within an optical path defined by the illumination light to provide a modified light that has a property indicative of the ion concentration in the fluid sample. In some embodiments, the detector receives the modified light and provides an electrical signal proportional to the property of the modified light.

C. A method including exchanging ions between a material and a fluid sample, optically interacting the material with an illumination light generated by an optical source to generate a modified light and detecting a change in the optical response of the material based on the modified light. In some embodiments, the method includes determining an ion concentration in the fluid sample from the change in the optical response of the material and modifying an operational parameter in a wellbore for oil and gas exploration or extraction according to the determined ion concentration.

Each of embodiments A, B and C may have one or more of the following additional elements in any combination: Element 1, wherein the sample cell facilitates optical interaction between the illumination light and the ion-selective membrane to generate a sample light, and the sample light interacts with the ICE to provide the modified light. Element 2, wherein the ion-selective membrane absorbs a pre-selected type of ions from the fluid sample up to an equilibrium value determined by the ion concentration in the sample. Element 3, including a second ion-selective membrane that absorbs a pre-selected, second type of ions from the fluid sample. Element 4, wherein the sample light is at least one of a fluorescent emission and a Raman emission. Element 5, wherein the property of the modified light is selected from a group consisting of an intensity, a polarization state, a phase, and a wavelength. Element 6, wherein the ion-selective membrane has an affinity optimized for an ion selected from the group consisting of $Na^+$, $Ca^{+2}$ $K^+$, $Mg^{+2}$, $Cr^{+3}$, $HCO_3^-$, $SO^-$, $NH^+$, and $NO_3^-$. Element 7, wherein the ion-selective membrane contacts the fluid sample at a first region and the ion-selective membrane interacts with the illumination light at a second region separated from the first region. Element 8, including at least a second ion-selective membrane that absorbs a second ion from the fluid sample and interacts with the illumination light. Element 9, wherein the device is an optical computing device in a system, the system further including: an optical source that provides the illumination light, and a controller communicable coupled to the optical computing device, wherein the controller determines the ion concentration in the fluid sample from the property of the modified light. Element 10, wherein the optical source includes one selected from the group consisting of a broadband lamp, a laser, and a light-emitting diode. Element 11, wherein the controller determines the ion concentration based on at least one of a temperature, a pressure, or a pH of the fluid sample.

Element 12, wherein the ion-selective membrane forms a layer interposed in a propagation path of the illumination light along the waveguide, and a thickness of the layer is larger than a coherence length of the illumination light.

Element 13, wherein detecting a change in the optical response of the material includes measuring a property of the modified light selected from the group consisting of an amplitude, a polarization state, a phase, a wavelength or a combination thereof. Element 14, wherein exchanging ions between the material and the fluid sample includes allowing for the ion exchange between the material and the fluid sample to reach equilibrium. Element 15, wherein determining the ion concentration in the fluid sample includes identifying a temperature, a pressure, and a pH of the fluid sample. Element 16, further including exchanging ions between a second material and the fluid sample, wherein the second material has an affinity optimized for a second ion.

The disclosure claimed is:

1. A device, comprising:
   an ion-selective membrane configured to:
     interact with a fluid sample of a downhole fluid; and
     modify an optical response of the ion-selective membrane according to an ion concentration in the fluid sample, wherein the ion selective membrane is arranged within an optical path of the device and coupled to a sample cell, and wherein the optical path of the device is defined by an illumination light;
   an integrated computational element (ICE) arranged within the optical path, wherein the illumination light optically interacts with the ICE and with the ion-selective membrane to provide a modified light that has a property indicative of the ion concentration in the fluid sample; and
   a detector that receives the modified light and provides an electrical signal proportional to the property of the modified light.

2. The device of claim 1 wherein the sample cell facilitates optical interaction between the illumination light and the ion-selective membrane to generate a sample light, and the sample light interacts with the ICE to provide the modified light.

3. The device of claim 1, wherein the ion-selective membrane absorbs a pre-selected type of ions from the fluid sample up to an equilibrium value determined by the ion concentration in the sample.

4. The device of claim 1, further including a second ion-selective membrane that absorbs a pre-selected, second type of ions from the fluid sample.

5. The device of claim 1, wherein the sample light is at least one of a fluorescent emission and a Raman emission.

6. The device of claim 1, wherein the property of the modified light is selected from a group consisting of an intensity, a polarization state, a phase, and a wavelength.

7. The device of claim 1, wherein the ion-selective membrane has an affinity optimized for an ion selected from the group consisting of $Na^+$, $Ca^{+2}$ $K^+$, $Mg^{+2}$, $Cr^{+3}$, $HCO_3^-$, $SO^-$, $NH^+$, and $NO_3^-$.

8. The device of claim 1, wherein the ion-selective membrane contacts the fluid sample at a first region and the ion-selective membrane interacts with the illumination light at a second region separated from the first region.

9. The device of claim 1, further comprising at least a second ion-selective membrane that absorbs a second ion from the fluid sample and interacts with the illumination light.

10. The device of claim 1, wherein the device is an optical computing device in a system, the system further comprising:
    an optical source that provides the illumination light; and
    a controller communicable coupled to the optical computing device, wherein the controller determines the ion concentration in the fluid sample from the property of the modified light.

11. The device of claim 10, wherein the optical source comprises one selected from the group consisting of a broadband lamp, a laser, and a light-emitting diode.

12. The device of claim 10, wherein the controller determines the ion concentration based on at least one of a temperature, a pressure, or a pH of the fluid sample.

13. A device, comprising:
    an optical waveguide that transmits an illumination light to a detector, and that couples with a fluid sample of a downhole fluid in at least one sample portion of the waveguide;
    an ion-selective membrane configured to:
      interact with the fluid sample; and
      modify an optical response of the ion-selective membrane according to an ion concentration in the fluid sample, wherein the ion-selective membrane is arranged within the sample portion of the waveguide; and
    an integrated computational element (ICE) arranged within an optical path defined by the illumination light to provide a modified light that has a property indicative of the ion concentration in the fluid sample; wherein
    the detector receives the modified light and provides an electrical signal proportional to the property of the modified light.

14. The device of claim 13, wherein the ion-selective membrane forms a layer interposed in a propagation path of the illumination light along the waveguide.

\* \* \* \* \*